United States Patent
Ignaczak et al.

(10) Patent No.: US 9,651,180 B2
(45) Date of Patent: May 16, 2017

(54) FUEL LINE CONNECTOR AND METHOD OF MAKING

(71) Applicant: Norma U.S. Holding LLC, Arburn Hills, MI (US)

(72) Inventors: Brian T. Ignaczak, Rochester, MI (US); David Charles Peterson, Ortonville, MI (US); Jason Earl Dendel, Sterling Heights, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 859 days.

(21) Appl. No.: 13/934,174

(22) Filed: Jul. 2, 2013

(65) Prior Publication Data

US 2014/0001748 A1    Jan. 2, 2014

Related U.S. Application Data

(60) Provisional application No. 61/667,113, filed on Jul. 2, 2012.

(51) Int. Cl.
   *F16L 39/02* (2006.01)
   *F16L 33/22* (2006.01)
   (Continued)

(52) U.S. Cl.
   CPC ........ *F16L 33/225* (2013.01); *B29C 45/0055* (2013.01); *B29C 45/1642* (2013.01);
   (Continued)

(58) Field of Classification Search
   CPC .............. F16L 37/1215; F16L 37/0985; F02M 25/0872
   (Continued)

(56) References Cited

U.S. PATENT DOCUMENTS 4,448,447 A * 5/1984 Funk ..................... F16L 37/008
                                                             285/319
5,324,081 A * 6/1994 Umezawa ........... F16L 37/0982
   (Continued)

FOREIGN PATENT DOCUMENTS

JP    2003254185 A    9/2003
JP    2012067779 A    4/2012

OTHER PUBLICATIONS

International Search Report for PCT application No. PCT/US2013/049171, dated Oct. 10, 2013, 3 pages.
(Continued)

*Primary Examiner* — David E Bochna
(74) *Attorney, Agent, or Firm* — Harness, Dickey & Pierce, P.L.C.

(57) ABSTRACT

A fuel line connector assembly that includes first and second connectors. The first connector includes a ramp having an inner core and an outer skin surrounding at least a part of the inner core. The inner core extends through the ramp at a location adjacent a radially extending retaining surface for at least a portion of the radial extent of the retaining surface. The second connector has a hook wherein, when the first and second connectors are brought together and secured to each other, the hook inhibits separation of the first and second connectors by bearing again the retaining surface. The first connector is made by coinjection molding a connector body having the outer skin and inner core with the inner core extending through the ramp to a sacrificial portion, and then severing the sacrificial portion from the ramp leaving the inner core exposed at an apex of the ramp.

8 Claims, 2 Drawing Sheets

(51) Int. Cl.
*F16L 37/12* (2006.01)
*F16L 37/56* (2006.01)
*F02M 37/00* (2006.01)
*F02M 25/08* (2006.01)
*B29C 45/16* (2006.01)
*B29C 45/00* (2006.01)
*F16L 37/098* (2006.01)

(52) U.S. Cl.
CPC .... *F02M 25/0872* (2013.01); *F02M 37/0017* (2013.01); *F16L 37/1225* (2013.01); *F16L 37/56* (2013.01); *F16L 39/02* (2013.01); *B29C 45/1676* (2013.01); *B29C 2793/0027* (2013.01); *F16L 37/0985* (2013.01)

(58) Field of Classification Search
USPC .......................................... 285/423, 305, 319
See application file for complete search history.

(56) References Cited

U.S. PATENT DOCUMENTS

| | | | |
|---|---|---|---|
| 5,505,495 A | 4/1996 | Godeau | |
| 5,799,986 A * | 9/1998 | Corbett | F16L 37/0985 |
| 6,056,029 A * | 5/2000 | Devall | B60K 15/03519 |
| 6,109,664 A * | 8/2000 | Guest | F16L 37/0925 |
| | | | 285/319 |
| 6,186,558 B1 * | 2/2001 | Komolrochanaporn | F16L 55/00 |
| 6,199,919 B1 | 3/2001 | Kawasaki et al. | |
| 6,257,287 B1 * | 7/2001 | Kippe | B60K 15/03504 |
| 6,289,915 B1 * | 9/2001 | Nulman | B60K 15/03519 |
| 6,412,830 B1 * | 7/2002 | Akiyama | F16L 37/0987 |
| | | | 285/319 |
| 6,502,607 B2 * | 1/2003 | Brown | B60K 15/04 |
| 6,637,780 B2 * | 10/2003 | Miyajima | F16L 37/0985 |
| | | | 285/305 |
| 6,755,206 B2 * | 6/2004 | Nishi | F16K 24/044 |
| 6,808,209 B2 * | 10/2004 | Nakaya | B60K 15/04 |
| 7,014,214 B2 * | 3/2006 | Kaneko | F16L 33/30 |
| 7,066,498 B2 * | 6/2006 | Kertesz | F16L 47/28 |
| 7,108,297 B2 * | 9/2006 | Takayanagi | F16L 37/0987 |
| | | | 285/305 |
| 7,147,001 B2 * | 12/2006 | Gamble | B60K 15/04 |
| 7,267,376 B2 * | 9/2007 | Isayama | F16L 47/02 |
| | | | 285/141.1 |
| 7,320,769 B2 * | 1/2008 | Aoki | B29C 45/16 |
| | | | 264/250 |
| 7,455,326 B2 * | 11/2008 | Matsuzaki | F16L 41/082 |
| | | | 285/141.1 |
| 7,458,391 B2 * | 12/2008 | Krishnamoorthy | B60K 15/04 |
| | | | 137/151 |
| 7,467,643 B2 * | 12/2008 | Kaneko | B60K 15/04 |
| | | | 137/592 |
| 7,614,666 B2 * | 11/2009 | Eggert | B60T 17/043 |
| | | | 285/293.1 |
| 7,631,904 B2 * | 12/2009 | Heim | F16L 37/088 |
| | | | 285/305 |
| 8,070,187 B2 * | 12/2011 | Athalye | F02M 37/0017 |
| | | | 285/239 |
| 2003/0178851 A1 * | 9/2003 | Kimisawa | B60K 15/03519 |
| 2005/0217265 A1 | 10/2005 | Popp et al. | |
| 2006/0152005 A1 | 7/2006 | Kertesz et al. | |
| 2007/0152444 A1 | 7/2007 | Kertesz et al. | |
| 2009/0051161 A1 | 2/2009 | Ekstrom | |
| 2010/0225108 A1 | 9/2010 | Mann | |

OTHER PUBLICATIONS

Written Opinion for PCT application No. PCT/US2013/049171, dated Oct. 10, 2013, 4 pages.

* cited by examiner

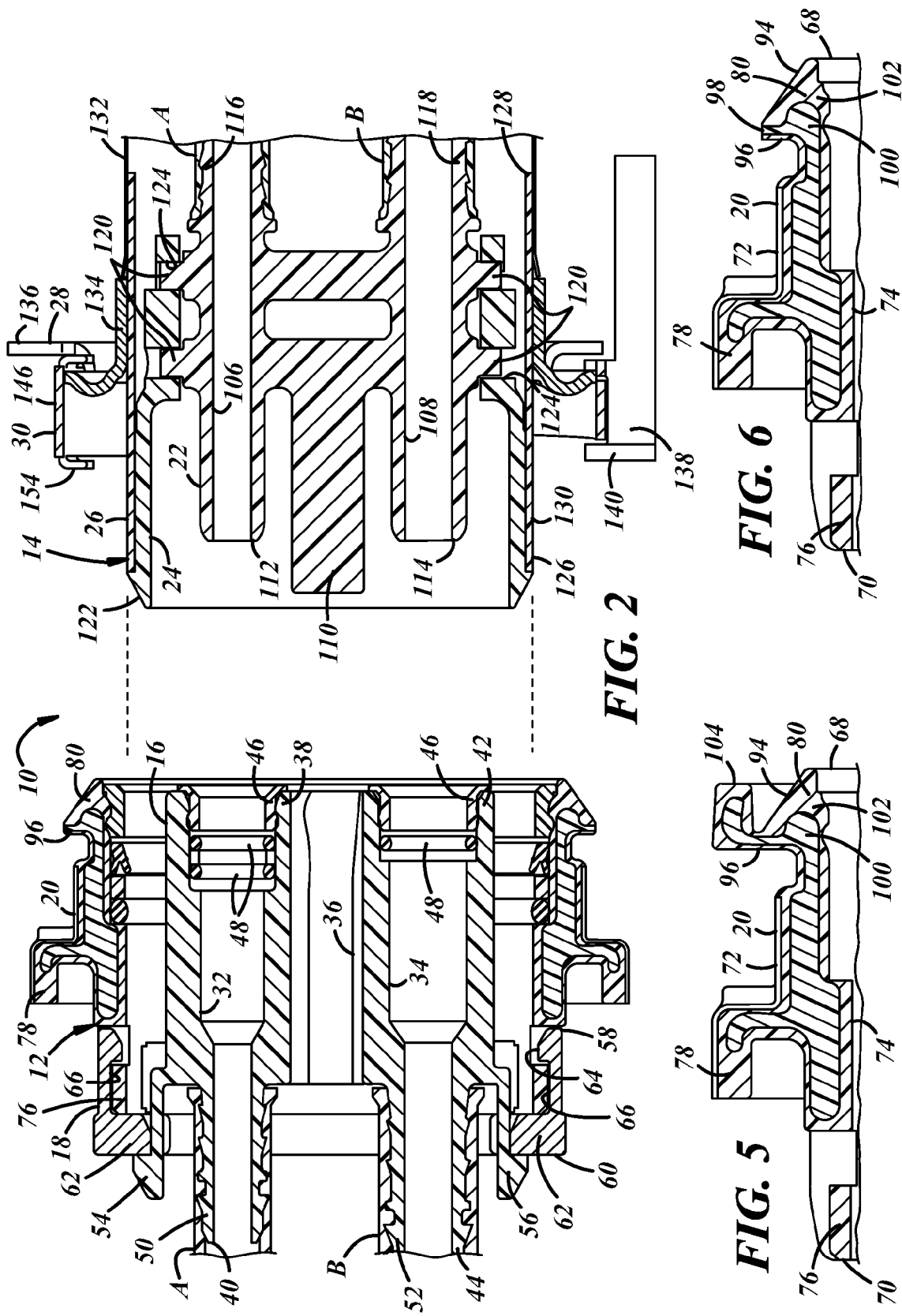

FUEL LINE CONNECTOR AND METHOD OF MAKING

CROSS-REFERENCE TO RELATED APPLICATION

This application claims the benefit of U.S. Provisional Application No. 61/667,113, filed Jul. 2, 2012, the entire contents of which are hereby incorporated by reference.

TECHNICAL FIELD

The invention relates generally to fluid connectors and, more particularly, to fuel line connectors.

BACKGROUND

In fuel systems for automotive internal combustion engines, connectors are often used to join fuel lines together to transport liquid fuel and fuel vapor among system components such as engines and fuel tanks To be effective, a connection should provide a fluid-tight seal and should provide good resistance against axial separation of the fuel lines.

SUMMARY

In accordance with one aspect of the invention, there is provided a fluid line connector assembly that includes first and second connectors. The first connector has an inner core and an outer skin surrounding at least a part of the inner core. The inner core is composed of a first material and the outer skin is composed of a second material. The first connector has a ramp with a retaining surface extending radially outwardly. The inner core extends through the ramp at a location adjacent the retaining surface for at least a portion of the radial extent of the retaining surface. The second connector has a hook wherein, when the first and second connectors are brought together and secured to each other, the hook inhibits separation of the first and second connectors by bearing again the retaining surface.

Other embodiments of the fluid line connector assembly may have the following additional features, either individually or in any technically feasible combination.

The inner core may span the full radial extent of the retaining surface and may be exposed at an outer surface of the ramp. Further, the inner core may be exposed at the outer surface at an apex of the ramp.

The assembly may further comprise a first fitting having at least a first passageway for fluid flow and a second fitting having at least a second passageway and being constructed to fit with the first fitting. The first connector may be coupled to the first fitting and the second connector coupled to the second fitting. When the first and second connectors are brought together and secured to each other, the first and second fitting are fitted together so that the first and second passageways fluidly communicate with each other.

The assembly may further comprise a collar, a first sleeve coupled to the first fitting and a second sleeve coupled to the second fitting and being constructed to fit with the first sleeve when the first and second connectors are brought together and secured to each other. The collar is coupled to the second sleeve wherein, in assembly, the second connector is releasably coupled to the collar.

The first material has a hardness property greater than a hardness property of said second material, whereby the inner core strengthens the ramp to thereby strengthen the connection of the first and second connectors against pull-apart forces.

The second connector may be a spring connector radially-inwardly biased and radially-outwardly displaceable.

In accordance with another aspect of the invention, there is provided a fuel line connector assembly comprising first and second fittings and a fluid line connector assembly as summarized above. The fittings may each have a liquid fuel passageway and a vapor fuel passageway. The fittings are connectable together to connect the liquid fuel passageways together and to connect the vapor fuel passageways together. The first connector may be attached to the first fitting and the second connector may be attached to the second fitting so that the fittings may be releasably held together by engagement of the first and second connectors when the fittings are connected together.

In accordance with another aspect of the invention, there is provided a method of making a connector for a fluid line connector assembly. The method includes the steps of (a) molding a connector body having a ramp with an outer skin and an inner core wherein the inner core extends through the ramp to a sacrificial portion formed at least partially from the outer skin; and (b) severing the sacrificial portion from the ramp.

Other embodiments of the method may have the following additional features, either individually or in any technically feasible combination.

The molding step may further comprise molding the connector body so that the inner core extends through the ramp and at least partially into the sacrificial portion, and the severing step may further comprise severing the sacrificial portion from the ramp by cutting through the outer skin and inner core so that the inner core is exposed at an apex of the ramp.

The molding step may comprise coinjection molding the connector body.

The molding step may further comprise molding the connector body as a one-piece body having a generally cylindrical shape that extends axially from one axial end to the ramp which is located at a second axial end, with the ramp extending radially outwardly to the sacrificial portion.

BRIEF DESCRIPTION OF THE DRAWINGS

One or more preferred exemplary embodiments of the invention will hereinafter be described in conjunction with the appended drawings, wherein like designations denote like elements, and wherein:

FIG. 2 is a cross-sectional view of the fuel line connector assembly of FIG. 1;

FIG. 5 is an enlarged cross-sectional view of a first connector of the fuel line connector assembly of FIG. 1; and FIG. 6 is an enlarged cross-sectional view of the first connector of FIG. 5.

DETAILED DESCRIPTION OF THE ILLUSTRATED EMBODIMENT(S)

Figure 1:
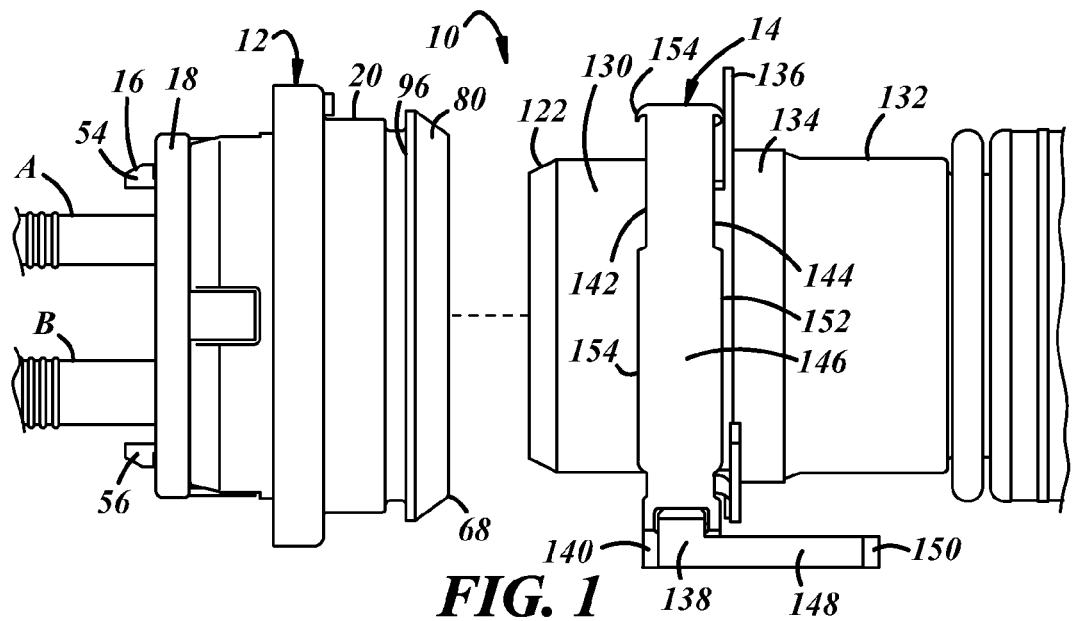
FIG. 1 is a side view of one embodiment of a fuel line connector assembly shown disconnected.

Referring to the drawings, FIGS. 1-6 show an embodiment of a fuel line connector assembly that is used to make a connection in fuel lines for, among other possible applications, automotive engine intake and exhaust systems, and between system components such as engines and fuel tanks. The illustrated fuel line connector assembly provides a fluid-tight seal between fuel lines, and performs better in axial pull-apart tests compared to some known fuel line connectors. Further, the disclosed fuel line connector assembly can limit or altogether eliminate jamming and other troubles that can occur while bringing connectors together and making a connection between fuel lines with the known connectors. Although the illustrated embodiment is directed a fuel line connector embodiment, the disclosed connector design and individual features thereof may be used not only for connecting liquid and/or vapor fuel lines, but also for other types of fluid line connectors including those used for connecting non-fuel liquid, gas, and/or vapor supply lines. As used herein, unless otherwise specified or unless the context otherwise requires, the terms radially, axially, and circumferentially refer to directions with respect to the generally tubular shape of the fuel line connector assembly shown in FIG. 1

Referring to FIGS. 1 and 2, there is shown a fuel line connector assembly 10 comprising a multi-piece assembly that includes a first fuel line connector 12 and a second fuel line connector 14 that are brought together to form a connection between vapor fuel lines A and liquid fuel lines B. The first fuel line connector 12 includes a first fitting 16, a first sleeve 18, and a first connector 20. And the second fuel line connector 14 includes a second fitting 22, a cuff 24, a second sleeve 26, a collar 28, and a second connector 30. In other embodiments not shown in the figures, more, less, or different components could be provided for the fuel line connector assembly; in one example, the sleeves need not be provided or their structure and functionality could be integrally combined with other components; and in another example, the collar and second connector could be integrally combined with each other.

The first fitting 16 is constructed to receive the second fitting 22 of the second fuel line connector 14 in assembly. The first fitting 16 can have different designs, constructions, and arrangements, including that shown by the embodiment of FIG. 2. The first fitting 16 can be composed of a plastic material such as nylon, and can be made by an injection molding process. In the embodiment, the first fitting 16 is the most radially-inwardly component of the first fuel line connector 12. The first fitting 16 defines a first passageway 32 for vapor fuel flow, defines a second passageway 34 for liquid fuel flow, and defines a guide bore 36 to receive a corresponding and complementary structure of the second fitting 22 as will be subsequently described. The first passageway 32 extends axially from a first open end 38 to a second open end 40, and has diametrically enlarged and reduced sections along its axial extent. Likewise, the second passageway 34 extends axially from a first open end 42 to a second open end 44, and has diametrically enlarged and reduced sections along its axial extent. Near the first open ends 38, 42, one or more retention spacers 46 and one or more o-rings 48 can be provided to facilitate sealing engagement between the first and second fittings 16, 22. Still referring to FIG. 2, the first fitting 16 has a first nipple 50 for insertion and fluid communication with a segment of the liquid fuel line A, and has a second nipple 52 for insertion and fluid communication with a segment of the vapor fuel line B. And for direct mechanical coupling with the first sleeve 18, the first fitting 16 has radially inwardly flexing first and second tangs 54, 56 projecting generally in the axial direction.

The first sleeve 18 is constructed to receive the second sleeve 26 of the second fuel line connector 14 in assembly. The first sleeve 18 can have different designs, constructions, and arrangements, including that shown by the embodiment of FIG. 2. The first sleeve 18 can be composed of a metal material such as nylon. In the embodiment, the first sleeve 18 is mechanically coupled directly to the first fitting 16 via the first and second tangs 54, 56 of the first fitting, and is mechanically coupled directly to the first connector 20 via complementary structures as will be subsequently described. The first sleeve 18 has a generally cylindrical shape, and extends from a first axial end 58 to a second axial end 60. A radially-inwardly directed projection 62 and the first and second tangs 54, 56 mechanically interlock to couple the first sleeve 18 to the first fitting 16. Further, on a radially-inwardly facing side 64, a relief 66 is provided to receive a complementary structure of the first connector 20.

The first connector 20 is brought together with, and secured to, the second connector 30 to provide the principal connection of the fuel line connector assembly 10. Secondary connections can be provided in the fuel line connector assembly 10, including connections made between the first and second fittings 16, 22, and connections made between the first and second sleeves 18, 26. Once secured, the first and second connectors 20, 30 inhibit axial separation of the first and second fuel line connectors 12, 14. The first connector 20 and the second connector 30 are constructed to mechanically interlock with each other. The first connector 20 can have different designs, constructions, and arrangements, including that shown by the embodiment of FIGS. 1, 2, 5, and 6. In the embodiment, the first connector 20 is the most radially-outwardly located component of the first fuel line connector 12, and is mechanically coupled directly to the first sleeve 18. The first connector 20 has a generally cylindrical shape, and extends from a first axial end 68 to a second axial end 70. On a radially-outwardly facing side, the first connector 20 has an outer surface 72, and on a radially-inwardly facing side, the first connector has an inner surface 74.

Figure 3:
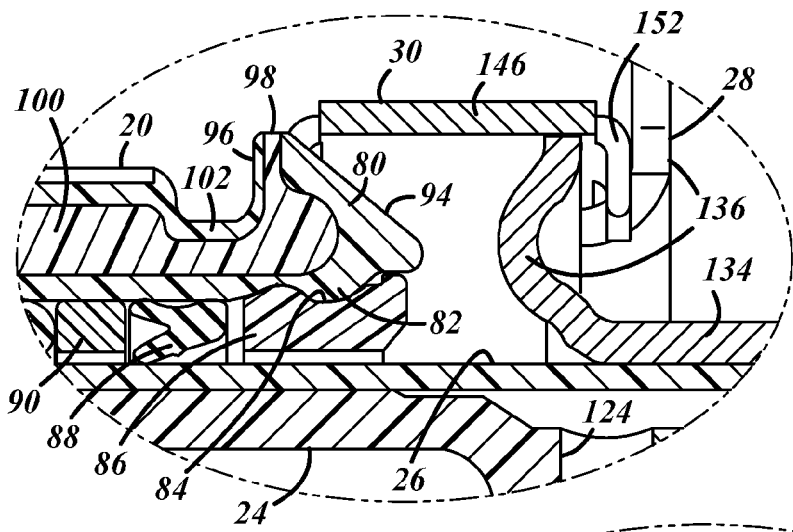
FIG. 3 is an enlarged cross-sectional view of the fuel line connector assembly of FIG. 1 shown in the midst of connecting.
Figure 4:
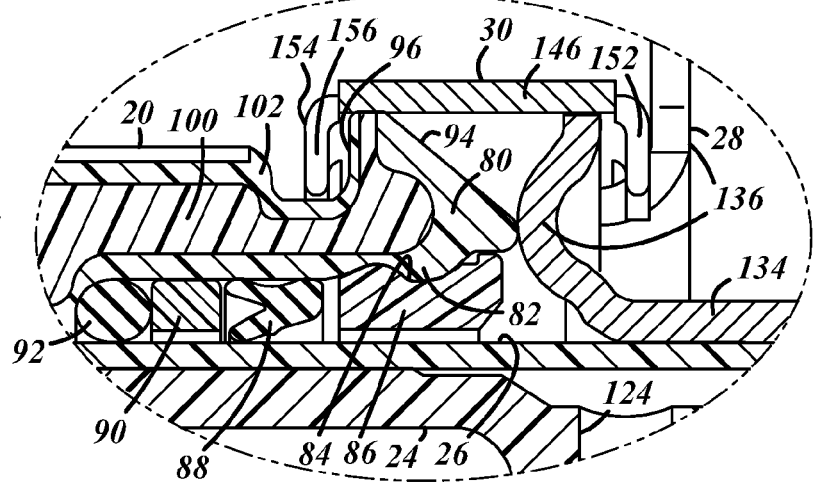
FIG. 4 is another enlarged cross-sectional view of the fuel line connector assembly of FIG. 1 shown connected.

The one-piece body of the first connector 20 includes a tongue 76, a skirt 78, and a ramp 80. The tongue 76 is received in the relief 66 to couple the first connector 20 and the first sleeve 18 together. The skirt 78 extends circumferentially continuously around the first connector 20. The ramp 80, also called a nose, is located near the first axial end 68 and constitutes the axially forwardly-most portion of the first connector 20 to interact with and engage a complementary structure of the second connector 30 when the first and second fuel line connectors 12, 14 are brought together. As best shown in FIGS. 3 and 4, on a radially-inwardly facing side, the ramp 80 has a rib 82 for nesting with an indentation 84 in an optionally provided retention spacer 86. In addition to the retention spacer 86, one or more Y-shaped seals 88 can be provided, one or more supplementary spacers 90 can be provided, and one or more o-rings 92 can be provided in assembly, if provided, these components are located between the first connector 20 and the second sleeve 26. The ramp 80 also has a ramp surface 94 and a retaining surface 96. The ramp surface 94 is slanted with respect to the axial and radial directions, is generally planar, and extends from a free end of the ramp 80 to an apex 98 of the ramp. The retaining surface 96 constitutes an axially-backwardly facing wall of the ramp 80, is generally radially directed, and is planar.

In use, when the first and second fuel line connectors 12, 14 are brought together and form a connection, the retaining surface 96 and its accompanying wall directly bear and endure pull-apart forces exerted from the second connector 30 and exerted to the retaining surface. The pull-apart forces can be generally axially directed, and tend to bring the first and second fuel line connectors 12, 14 apart. It has been found that known connectors having ramps unlike the ramp 80 shown and described herein, exhibit insufficient strength to withstand pull-apart forces in some applications. In some cases, the retaining surface and wall of the known connectors break and fail during testing and potentially during use. As a remedy in the known connectors, structural modifications have been made to the known ramps such as enlarging its size. While these modifications may be suitable in some applications, they can have undesirable tradeoffs such as increasing the insertion force required to secure the first and second connectors together, and can cause jamming or other troubles that occur in the midst of insertion.

The ramp 80 of the first connector 20 has been designed and constructed to strengthen the retaining surface 96 and its accompanying wall compared to the known connectors, so that the ramp shown and described herein can withstand greater pull-apart forces and does not break and fail during testing and during use. Accordingly, the ramp 80 need not, though could, have the structural modifications provided for the known ramps as a remedy. Referring back to FIGS. 5 and 6, the first connector 20 is made by a coinjection molding process and has an inner core 100 and an outer skin 102. The inner core 100 can be composed of a material that is harder than the material of the outer skin 102 so that the inner core serves as a reinforcement skeleton for the first connector 20. For example, the inner core 100 can be composed of a fiber-glass reinforced polyamide 12 (PA12) material (e.g., 30% glass-filled). The outer skin 102, on the other hand, can be composed of a high-density polyethylene (HDPE) material with a hardness property less than that of the inner core 100 material. In one example application, the HDPE material is compatible for welding to a material of a fuel tank. Other examples of materials for the inner core 100 and outer skin 102 are possible.

Initially out of a coinjection machine mold cavity, the first connector 20 is in an unfinished state and has a sacrificial portion 104 extending generally radially-outwardly from the ramp 80. The unfinished state and the sacrificial portion 104 are shown in FIG. 5. During the coinjection molding process, the sacrificial portion 104 leads the flow of molten material of the inner core 100 radially-outwardly through the ramp 80 and along the full radial extent of the retaining surface 96. FIG. 5 shows the sacrificial portion 104 with the inner core 100 and outer skin 102 solidified. Upon complete solidification, the sacrificial portion 104 is removed from the first connector 20 via a severing or cutting process, leaving the inner core 100 exposed at the outer surface 72 and exposed at the apex 98. The finished state is shown in FIG. 6; other processes may be performed to produce the finished state. Here, the inner core 100 is located adjacent the retaining surface 96 and stiffens and strengthens the retaining surface. The inner core 100 can have an axial thickness that is greater than the axial thickness of the outer skin 102 at the retaining surface 96. In other embodiments, the inner core could extend less than the full radial extent of the retaining surface and need not be exposed at the outer surface and at the apex.

The second fitting 22 is constructed for insertion into the first fitting 16 in assembly. The second fitting 22 can have different designs, constructions, and arrangements, including that shown by the embodiment of FIG. 2. The second fitting 22 can be composed of a plastic material such as PA12, and can be made by an injection molding process. In the embodiment, the second fitting 22 is the most radially-inwardly component of the second fuel line connector 14. The second fitting 22 defines a first passageway 106 for vapor fuel flow, defines a second passageway 108 for liquid fuel flow, and has a guide appendage 110. The first passageway 106 fluidly communicates with the first passageway 32 of the first fitting 16 when the first and second fuel line connectors 12, 14 are brought together. The first passageway 106 extends axially from a first open end 112 to a second open end (not shown). Similarly, the second passageway 108 fluidly communicates with the second passageway 34 of the first fitting 16 when the first and second fuel line connectors 12, 14 are brought together. And the second passageway 108 extends axially from a first open end 114 to a second open end (not shown). The guide appendage 110 is inserted into the guide bore 36 when the first and second fuel line connectors 12, 14 are brought together, and pilots alignment and orientation of the first and second fuel line connectors and components thereof. Still referring to FIG. 2, the second fitting 22 has a first nipple 116 for insertion and fluid communication with a segment of the vapor fuel line A, and has a second nipple 118 for insertion and fluid communication with a segment of the liquid fuel line B. And for direct mechanical coupling with the cuff 24, the second fitting 22 has radially-outwardly directed projections 120.

The cuff 24 is constructed to provide direct mechanical coupling to the second fitting 22, and for insertion into the first sleeve 18. The cuff 24 can have different designs, constructions, and arrangements, including that shown by the embodiment of FIG. 2. The cuff 24 can be composed of a plastic material such as PA12, and can be made by an injection molding process. In the embodiment, the cuff 24 has a generally cylindrical shape, and is positioned radially between the second fitting 22 and the second sleeve 26. To provide support for the second sleeve 26, a radially-outwardly facing side of the cuff 24 maintains direct surface-to-surface contact with a radially-inwardly facing side of the second sleeve over an axial extent of the cuff and of the second sleeve. The cuff 24 has a ramp 122 at a terminal end thereof to facilitate insertion into the first sleeve 18. And the cuff 24 has apertures 124 located axially opposite the ramp 122 for receiving insertion of the projections 120 of the second fitting 22.

The second sleeve 26 is constructed for insertion into the first sleeve 18 of the first fuel line connector 12 in assembly. The second sleeve 26 can have different designs, constructions, and arrangements, including that shown by the embodiment of FIG. 2. The second sleeve 26 can be composed of a metal material such as stainless steel. In the embodiment, the second sleeve 26 has a generally cylindrical shape, and is positioned radially between the cuff 24 and the collar 28. And the second sleeve 26 extends axially between a first open end 126 and a second open end 128.

The collar 28 is constructed to carry the second connector 30. The collar 28 can have different designs, constructions, and arrangements, including that shown by the embodiment of FIG. 2. The collar 28 can be composed of a metal material such as stainless steel. In the embodiment, the collar 28 has a generally cylindrical shape. The collar 28 is coupled to a radially-outwardly facing surface 130 of the second sleeve 26 via a brazing process and brazing attachment, and the second sleeve itself can be coupled to a metal conduit 132 also via a brazing process and brazing attachment; other ways of attaching are possible such as welding. Referring to FIGS. 1 and 2, the collar 28 has a radial extension 134 that makes surface-to-surface contact with the second sleeve 26 and is brazed thereto, and has an axial extension 136 that can have one or more slot(s) for receiving a complementary structure of the second connector 30. The slot(s) can extend circumferentially, radially, or both.

The second connector 30 is constructed to form a coupling with the first connector 20. The second connector 30 can have different designs, constructions, and arrangements, including that shown by the embodiment of FIGS. 1-4. In the embodiment, the second connector 30 and the collar 28 are the most radially-outwardly located components of the second fuel line connector 14. The second connector 30 has a one-piece body that is generally cylindrically shaped. The body can be composed of a metal material such as stainless steel. In this embodiment, the second connector 30 is a spring clamp, but other types of connectors and clamps are possible. The second connector 30 has an open circumference construction with a first circumferential end 138 and a second circumferential end 140, and extends axially between a first axial end 142 and a second axial end 144. For latching and unlatching the second connector 30 to and from the collar 28, the second connector is radially-inwardly biased and radially-outwardly displaceable with a variably contracting and expanding circumference. Still referring to FIGS. 1-4, the second connector 30 has a band 146 with first and second actuating tabs 148, 150 located at the circumferential ends 138, 140 that can be squeezed toward each other and released to circumferentially respectively expand and contract the band. When squeezed, prongs 152 at the second axial end 144 can be inserted into and taken out of the slot(s) of the collar 28. When released, the prongs 152 can be captured in the slot(s) to latch the second connector 30 and the collar 28 together. At the first axial end 142, the second connector 30 has a hook 154 that can snap over the ramp 80 of the first connector 20 and retain the first and second connectors together by abutment of the hook 154 with the retaining surface 96 at the backside of ramp 80. The hook 154 constitutes the axially forwardly-most portion of the second connector 30, and has a radially-inwardly projecting portion 156.

In use, the first fuel line connector 12 and the second fuel line connector 14 are brought together to form a connection between the vapor fuel lines A and liquid fuel lines B. The first and second connectors 20, 30 are secured to each other to provide the principal connection of the fuel line connector assembly 10. In FIG. 3, the first and second connectors 20, 30 are shown in the midst of engagement and coming together; and in FIG. 4, the first and second connectors are shown fully engaged and secured. As the first and second connectors 20, 30 engage, a terminal end of the hook 154 abuts against and slides up over the ramp surface 94 of the ramp 80. Though not depicted in FIG. 3, the hook 154, the ramp 80, or both, could flex and give way as the hook and ramp engage each other and the hook rides over the ramp. Once past the apex 98, the hook 154 can snap back radially inwardly, capturing the ramp 80 underneath the band 146 and preventing separation of the first and second connectors by abutment of the hook portion 156 against the retaining surface 96 at the back side of the ramp 80—this is shown in FIG. 4. The inner core 100 strengthens the ramp 80 behind the retaining surface 96 where the inner core 100 extends up to the apex 98 that was formed by severing the sacrificial portion 104 during manufacturing. This helps inhibit unwanted separation of the first and second connectors 20, 30 once they are secured.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A fluid line connector assembly, comprising:
a first connector having an inner core and an outer skin surrounding at least a part of said inner core, said inner core composed of a first material and said outer skin composed of a second material, said first connector including a ramp having a retaining surface extending radially outwardly, said inner core extending radially outwardly through said ramp at a location adjacent said retaining surface for at least a portion of the radial extent of said retaining surface and the inner core is exposed at an outer surface of the ramp; and
a second connector having a hook;
wherein, when said first and second connectors are brought together and secured to each other, said hook inhibits separation of the connectors by abutment of the hook with the retaining surface.

2. A fluid line connector assembly as defined in claim 1, wherein said first material has a hardness property greater than a hardness property of said second material, whereby said inner core strengthens the ramp to thereby strengthen the connection of the first and second connectors against pull-apart forces.

3. A fluid line connector assembly as defined in claim 1, wherein said second connector is a spring connector radially-inwardly biased and radially-outwardly displaceable.

4. A fuel line connector assembly, comprising:
first and second fittings, said fittings each having a liquid fuel passageway and a vapor fuel passageway, wherein the fittings are connectable together to connect the liquid fuel passageways together and to connect the vapor fuel passageways together;
a fluid line connector assembly comprising:
a first connector having an inner core and an outer skin surrounding at least a part of said inner core, said inner core composed of a first material and said outer skin composed of a second material, said first connector including a ramp having a retaining surface extending radially outwardly, said inner core extending through said ramp at a location adjacent said retaining surface for at least a portion of the radial extent of said retaining surface;
a second connector having a hook;
wherein, when said first and second connectors are brought together and secured to each other, said hook inhibits separation of the connectors by abutment of the hook with the retaining surface; and wherein the first connector is attached to the first fitting and the second connector is attached to the second fitting so that the fittings may be releasably held together by engagement of the first and second connectors when the fittings are connected together.

5. A fluid line connector assembly, comprising:
a first connector having an inner core and an outer skin surrounding at least a part of said inner core, said inner core composed of a first material and said outer skin composed of a second material, said first connector including a ramp having a retaining surface extending radially outwardly, said inner core extending through the full radial extent of said retaining surface and is exposed at an outer surface of said ramp at a location adjacent said retaining surface; and
a second connector having a hook;
wherein, when said first and second connectors are brought together and secured to each other, said hook inhibits separation of the connectors by abutment of the hook with the retaining surface.

6. A fluid line connector assembly as defined in claim 5, wherein said inner core is exposed at said outer surface at an apex of said ramp.

7. A fluid line connector assembly, comprising:
a first connector having an inner core and an outer skin surrounding at least a part of said inner core, said inner core composed of a first material and said outer skin composed of a second material, said first connector including a ramp having a retaining surface extending radially outwardly, said inner core extending through said ramp at a location adjacent said retaining surface for at least a portion of the radial extent of said retaining surface;
a second connector having a hook;
wherein, when said first and second connectors are brought together and secured to each other, said hook inhibits separation of the connectors by abutment of the hook with the retaining surface;
a first fitting having at least a first passageway for fluid flow, said first connector being coupled to said first fitting; and
a second fitting having at least a second passageway and constructed to fit with said first fitting, said second connector being coupled to said second fitting;
wherein, when said first and second connectors are brought together and secured to each other, said first and second fitting are fitted together so that said first and second passageways fluidly communicate with each other.

8. A fluid line connector assembly as defined in claim 7, further comprising:
a first sleeve coupled to said first fitting;
a second sleeve coupled to said second fitting and constructed to fit with said first sleeve when said first and second connectors are brought together and secured to each other; and
a collar coupled to said second sleeve;
wherein, in assembly, said second connector is releasably coupled to said collar.

* * * * *

UNITED STATES PATENT AND TRADEMARK OFFICE
CERTIFICATE OF CORRECTION

PATENT NO. : 9,651,180 B2  
APPLICATION NO. : 13/934174  
DATED : May 16, 2017  
INVENTOR(S) : Brian Ignaczak et al.

Page 1 of 1

It is certified that error appears in the above-identified patent and that said Letters Patent is hereby corrected as shown below:

On the Title Page

Item (71), Applicant    "Arburn Hills" should be --Auburn Hills--.

In the Specification

Column 1  
Line 21    "tanks" should be --tanks.--.

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*